(12) United States Patent
Josserand et al.

(10) Patent No.: US 10,180,285 B2
(45) Date of Patent: Jan. 15, 2019

(54) AIR TERMINAL FOR HEATING OR AIR CONDITIONING SYSTEM

(71) Applicants: CARRIER CORPORATION, Farmington, CT (US); Olivier Josserand, Montluel (FR); Stéphane Brise, Montluel (FR); Jacques René Schmid, Montluel (FR)

(72) Inventors: Olivier Josserand, La Boisse (FR); Stephane Brise, Maubec (FR); Jacques Rene Schmid, Soisy sur Seine (FR)

(73) Assignee: CARRIER CORPORATION, Farmington, CT (US)

( * ) Notice: Subject to any disclaimer, the term of this patent is extended or adjusted under 35 U.S.C. 154(b) by 488 days.

(21) Appl. No.: 14/762,034

(22) PCT Filed: Jan. 21, 2013

(86) PCT No.: PCT/IB2013/000531
§ 371 (c)(1),
(2) Date: Jul. 20, 2015

(87) PCT Pub. No.: WO2014/111742
PCT Pub. Date: Jul. 24, 2014

(65) Prior Publication Data
US 2015/0362256 A1 Dec. 17, 2015

(51) Int. Cl.
*F24F 7/00* (2006.01)
*F28D 7/00* (2006.01)
(Continued)

(52) U.S. Cl.
CPC .......... *F28D 7/0058* (2013.01); *F24F 1/0007* (2013.01); *F24F 3/06* (2013.01);
(Continued)

(58) Field of Classification Search
CPC ......... F28D 7/0058; F24F 1/0007; F24F 3/06; F24F 11/0012; F24F 11/04
See application file for complete search history.

(56) References Cited

U.S. PATENT DOCUMENTS 2,126,230 A * 8/1938 Troxell, Jr. ............. F24F 13/06
165/99
2,189,008 A * 2/1940 Kurth .................. F21V 33/0088
362/294
(Continued)

FOREIGN PATENT DOCUMENTS

DE 29916321 U1 1/2000
DE 102007027839 A1 12/2008
(Continued)

OTHER PUBLICATIONS

Notification of Transmittal of the International Search Report and the Written Opinion of the International Searching Authority; PCT/IB2013/000531; dated Sep. 20, 2013; ISR 6 pages.
(Continued)

*Primary Examiner* — Ljiljana Ciric
(74) *Attorney, Agent, or Firm* — Cantor Colburn LLP

(57) ABSTRACT

An air terminal for a heating or air conditioning system including a housing, a fresh air inlet in the housing to supply a fresh airflow to the air terminal, an outlet diffuser at the housing to allow airflow from the air terminal into a conditioned space, an inlet diffuser located at the housing to allow return airflow from the conditioned space into the air terminal, a coil located in the housing to condition the fresh airflow and/or the return airflow prior to the fresh airflow and/or the return airflow flowing into the conditioned space. A fan is located in the housing to urge return airflow through the inlet diffuser and across the coil. The fan and the inlet diffuser are located at a first side of the coil and the outlet
(Continued)

diffuser and the fresh air inlet are located at a second side of the coil opposite the first side.

5 Claims, 3 Drawing Sheets

(51) Int. Cl.
 F24F 1/00 (2011.01)
 F24F 3/06 (2006.01)
 F24F 11/30 (2018.01)
 F24F 11/74 (2018.01)
 F24F 3/00 (2006.01)
 F24F 110/10 (2018.01)
 F24F 110/70 (2018.01)

(52) U.S. Cl.
 CPC ............ F24F 11/30 (2018.01); F24F 11/74 (2018.01); F24F 2001/007 (2013.01); F24F 2001/0037 (2013.01); F24F 2001/0051 (2013.01); F24F 2001/0062 (2013.01); F24F 2001/0074 (2013.01); F24F 2003/003 (2013.01); F24F 2003/005 (2013.01); F24F 2003/006 (2013.01); F24F 2110/10 (2018.01); F24F 2110/70 (2018.01); Y02B 30/78 (2013.01)

(56) References Cited

U.S. PATENT DOCUMENTS

| | | | | |
|---|---|---|---|---|
| 2,217,944 A | * | 10/1940 | Collicutt | F24F 7/06 454/269 |
| 2,237,332 A | * | 4/1941 | Bretzlaff | F24F 3/14 62/285 |
| 2,567,915 A | * | 9/1951 | Smith | F24F 1/022 312/236 |
| 2,724,578 A | * | 11/1955 | Swank | F24F 1/027 165/48.1 |
| 2,783,616 A | * | 3/1957 | Dodge | F24F 5/001 62/113 |
| 2,783,623 A | * | 3/1957 | Dodge | F24F 13/22 165/124 |
| 2,817,217 A | * | 12/1957 | Winkler | F24F 1/02 165/48.1 |
| 3,020,822 A | * | 2/1962 | Hopkinson | F24F 1/02 454/321 |
| 3,143,952 A | * | 8/1964 | Simons | F24F 9/00 454/190 |
| 3,314,249 A | * | 4/1967 | Lundbom | B60H 1/00364 165/141 |
| 3,519,069 A | * | 7/1970 | Green | F24F 1/02 165/122 |
| 3,625,022 A | * | 12/1971 | Johnson | F24F 3/044 165/253 |
| 3,703,140 A | * | 11/1972 | Gutheim | F24F 3/044 251/61.1 |
| 3,789,621 A | * | 2/1974 | Inuzuka | F24F 1/00 165/207 |
| 3,823,768 A | * | 7/1974 | Finger | F24F 1/00 165/122 |
| 3,855,814 A | * | 12/1974 | Eubank | B60H 1/3226 165/42 |
| 3,932,157 A | * | 1/1976 | Bolton | F24F 13/10 62/404 |
| 3,949,810 A | * | 4/1976 | Cobb | F24F 3/0444 165/216 |
| 3,952,795 A | * | 4/1976 | Clark | F24F 3/0444 165/216 |
| 3,964,268 A | * | 6/1976 | DiPeri | F24F 5/0035 62/121 |
| 3,988,900 A | * | 11/1976 | Kamata | F24F 1/00 454/236 |
| 3,991,819 A | * | 11/1976 | Clark | F25B 29/00 165/59 |
| 4,014,381 A | * | 3/1977 | Clark | F24F 3/0444 165/216 |
| 4,019,566 A | * | 4/1977 | Cobb | F24F 3/0444 165/216 |
| 4,102,494 A | * | 7/1978 | Coleman | F24F 3/0444 165/290 |
| 4,406,397 A | * | 9/1983 | Kamata | F24F 3/048 165/208 |
| 4,429,735 A | * | 2/1984 | Nomaguchi | B05B 3/001 165/60 |
| 4,519,217 A | * | 5/1985 | Phillips | F24F 3/044 165/249 |
| 4,655,278 A | * | 4/1987 | Seguin | F24F 3/001 165/48.1 |
| 4,718,021 A | * | 1/1988 | Timblin | F24F 3/044 165/212 |
| 4,727,931 A | * | 3/1988 | Berner | F24F 3/1423 165/8 |
| 4,733,543 A | * | 3/1988 | Blair | F24F 1/0003 312/236 |
| 4,771,611 A | * | 9/1988 | McNab | F24F 3/147 62/311 |
| 4,874,038 A | * | 10/1989 | Ehlert | F24F 3/044 165/48.1 |
| 4,970,876 A | * | 11/1990 | Vinokurov | B60H 1/3202 261/107 |
| 5,062,280 A | * | 11/1991 | Martin, Sr. | F24F 3/044 165/126 |
| 5,101,639 A | * | 4/1992 | Wruck | F24F 3/06 236/1 B |
| 5,117,563 A | * | 6/1992 | Castonguay | D06F 58/20 165/54 |
| 5,179,998 A | * | 1/1993 | Des Champs | F24F 3/14 165/222 |
| 5,183,098 A | * | 2/1993 | Chagnot | F24F 3/1423 165/54 |
| 5,188,169 A | * | 2/1993 | Lim | F24F 3/153 165/122 |
| 5,220,955 A | * | 6/1993 | Stokes | F04D 29/5826 165/122 |
| 5,238,052 A | * | 8/1993 | Chagnot | F24F 3/1423 165/54 |
| 5,251,815 A | * | 10/1993 | Foye | G05D 7/0635 236/49.3 |
| 5,271,558 A | * | 12/1993 | Hampton | F24F 13/06 236/49.3 |
| 5,301,744 A | * | 4/1994 | Derks | F24F 13/20 165/137 |
| 5,341,988 A | * | 8/1994 | Rein | F24F 11/00 236/49.3 |
| 5,344,069 A | * | 9/1994 | Narikiyo | F24F 3/001 165/207 |
| 5,408,838 A | * | 4/1995 | Yaeger | F24F 1/027 62/122 |
| 5,485,878 A | * | 1/1996 | Derks | F24F 3/044 165/137 |
| 5,533,668 A | * | 7/1996 | Erikson | F24F 3/044 137/802 |
| 5,542,469 A | * | 8/1996 | Kim | F24F 1/022 165/122 |
| 5,547,018 A | * | 8/1996 | Takahashi | F24F 1/0011 165/122 |
| 5,655,383 A | * | 8/1997 | Ferzoco | E01H 13/00 62/272 |
| 5,680,711 A | * | 10/1997 | Moratalla | F26B 21/00 34/77 |
| 5,715,701 A | * | 2/1998 | Kreymer | B64F 1/305 454/119 |
| 5,725,148 A | * | 3/1998 | Hartman | F24F 3/044 165/217 |
| 5,810,245 A | * | 9/1998 | Heitman | F24F 11/0076 165/208 |
| 5,855,320 A | * | 1/1999 | Grinbergs | F24F 12/006 237/46 |

(56) References Cited

U.S. PATENT DOCUMENTS

| | | | | |
|---|---|---|---|---|
| 5,921,088 | A * | 7/1999 | Imaizumi | F24F 3/14 62/271 |
| 5,953,926 | A * | 9/1999 | Dressler | F24F 3/147 236/44 C |
| 5,976,010 | A * | 11/1999 | Reese | F24F 11/0017 454/229 |
| 6,038,879 | A * | 3/2000 | Turcotte | F24F 1/022 62/325 |
| 6,079,626 | A * | 6/2000 | Hartman | F24F 3/044 236/13 |
| 6,131,653 | A * | 10/2000 | Larsson | F24F 3/14 165/224 |
| 6,355,091 | B1 * | 3/2002 | Felber | F24F 3/1411 95/10 |
| 6,386,970 | B1 * | 5/2002 | Vernier, II | F24F 13/072 454/303 |
| 6,434,969 | B1 * | 8/2002 | Sosnowski | F24D 5/12 62/411 |
| 6,637,232 | B1 * | 10/2003 | Harshberger | F24F 1/0007 165/122 |
| 6,688,384 | B2 * | 2/2004 | Eoga | F24F 11/0012 165/212 |
| 6,725,915 | B2 * | 4/2004 | Wheat | F24F 1/0007 165/221 |
| 6,945,866 | B2 * | 9/2005 | Demster | E04B 9/02 454/248 |
| 6,997,390 | B2 * | 2/2006 | Alles | F24F 3/0442 236/49.4 |
| 7,185,510 | B2 * | 3/2007 | Lee | F24F 1/0007 62/411 |
| 7,434,412 | B1 * | 10/2008 | Miyahira | G06F 1/20 165/104.33 |
| 7,533,716 | B2 * | 5/2009 | Bianco | F25D 17/067 165/122 |
| 8,453,790 | B1 * | 6/2013 | Oliver | F24F 1/0007 181/224 |
| 8,864,447 | B1 * | 10/2014 | Humphrey | F04D 17/04 415/118 |
| 8,943,848 | B2 * | 2/2015 | Phannavong | F24F 12/001 62/160 |
| 9,719,689 | B2 * | 8/2017 | Josserand | F24F 1/0007 |
| 9,726,442 | B2 * | 8/2017 | Bagwell | F24F 13/26 |
| 9,816,724 | B2 * | 11/2017 | Phannavong | F24F 12/001 |
| 2004/0108388 | A1 * | 6/2004 | Wacker | F24F 3/153 236/44 C |
| 2004/0148950 | A1 * | 8/2004 | Catzel | F24F 3/08 62/180 |
| 2007/0015455 | A1 * | 1/2007 | Knight | F24F 1/0007 454/292 |
| 2007/0082601 | A1 * | 4/2007 | Desrochers | F24F 3/044 454/256 |
| 2009/0013715 | A1 * | 1/2009 | Setoguchi | F24F 1/0007 62/524 |
| 2012/0052786 | A1 * | 3/2012 | Clawsey | F24F 7/065 454/229 |
| 2012/0222851 | A1 | 9/2012 | Arinez | |
| 2015/0019022 | A1 * | 1/2015 | Karamanos | G05D 7/0647 700/276 |
| 2015/0114596 | A1 * | 4/2015 | Rohde | F24F 13/10 165/59 |
| 2016/0245541 | A1 * | 8/2016 | Karamanos | G05D 7/0635 |
| 2016/0305677 | A1 * | 10/2016 | Hirsch | F24F 11/0001 |

FOREIGN PATENT DOCUMENTS

| | | |
|---|---|---|
| DE | 102008007641 A1 | 8/2009 |
| EP | 1281429 A1 | 2/2003 |
| EP | 1571402 A1 | 9/2005 |
| EP | 2244021 A2 | 10/2010 |
| FR | 2912808 A1 | 8/2008 |
| WO | 2007084139 A1 | 7/2007 |

OTHER PUBLICATIONS

Notification of Transmittal of the International Search Report and the Written Opinion of the International Searching Authority; PCT/IB2013/000531; dated Sep. 20, 2013; Written Opinion 6 pages.

* cited by examiner

AIR TERMINAL FOR HEATING OR AIR CONDITIONING SYSTEM

BACKGROUND

The subject matter disclosed herein relates to hydronic air conditioning systems.

A typical hydronic air conditioning system includes several components. First, the system includes heat pumps or chillers or other systems, such as boilers, to provide a flow of hot or cold (as needed) water, which is used as the thermal energy transfer medium, to the system. Second, the system typically includes an air handling unit. The air handling unit is utilized to provide fresh air to the system, and may include a heating and/or cooling coil to treat the fresh air before it is introduced to the conditioned space. Further, the system includes a climatic beam having a heating and/or cooling coil through which hot or cold water produced by the heat pump or chiller is circulated. The pretreated fresh air is flowed through nozzles in the climatic beam and into the space to be conditioned. The treated fresh air proceeds into the room, setting up an induction cycle where ambient air from the room is urged past the coil, and recirculated into the room.

The climatic beam provides a good level of comfort mainly in cooling mode since the air velocity in the room is low. As it uses cold water at relatively high ΔT, it provides an operation energy savings at the heat pump/chiller. In cooling mode, however, the cold water has to be carefully managed in order to avoid condensation depending on the ambient air conditions (temperature and relative humidity). The climatic beam does not filter the room air recirculated through the system, so air quality is improved only by the primary or fresh air flow. A $CO_2$ sensor can be located at the air inlet grille of the chilled beams and then can trigger the fresh airflow intake into the room as necessary to manage $CO_2$ levels in the room. One advantage is that if nobody is in the room, the fresh airflow can be drastically reduced which generates energy savings.

In heating mode at low airflow, a stratification phenomena can occur creating discomfort when the temperature of the water circulating in the coil is too high. The stratification causes the $CO_2$ sensor not to measure the true $CO_2$ level of the room due to the stratification effect, thus resulting in additional potential discomfort. Similarly, stratification results in the true room temperature not being measured by a temperature sensor in the room.

The primary ("fresh") airflow is often higher than the hygienic airflow required by the hygienic codes, which requires that air handling units are sized to match building thermal loads. The primary airflow is usually significant as it has to fit both hygienic and thermal requirements in the building and is only slightly modifiable. This significant fresh airflow requires a large duct to be installed in the building to handle the required flow. Further, the air handling unit is oversized compared to those used in other hydronic systems, as it has to fit both hygienic and thermal requirements. The air handling unit has to deliver a high static pressure in order to provide the right amount of fresh air to each of the chilled beams. The air handling unit has to operate during the night, mainly during winter time, in order to keep a minimum temperature within the building.

In a same building, the chilled beams' size (usually the length) vary depending on the expected room loads. This creates complications for HVAC and false ceiling installers.

BRIEF SUMMARY

An air terminal for a heating or air conditioning system includes a housing and a fresh air inlet in the housing to supply a fresh airflow to the air terminal. An outlet diffuser is located at the housing to allow airflow from the air terminal into a conditioned space. An inlet diffuser is located at the housing to allow return airflow from the conditioned space into the air terminal. A coil is located in the housing through which a heat transfer medium is flowable to condition the fresh airflow and/or the return airflow prior to flowing through the outlet diffuser into the conditioned space. A fan is located in the housing to urge return airflow through the inlet diffuser and across the coil.

An air conditioning system includes a source of heat transfer fluid and an air terminal in fluid communication with the source of heat transfer fluid. The air terminal includes a housing and a fresh air inlet in the housing to supply a fresh airflow to the air terminal. An outlet diffuser is located at the housing to allow airflow from the air terminal into a conditioned space. An inlet diffuser is located at the housing to allow return airflow from the conditioned space into the air terminal. A coil is located in the housing through which the heat transfer medium is flowable to condition the fresh airflow and/or the return airflow prior to flowing through the outlet diffuser into the conditioned space. A fan is located in the housing to urge return airflow through the inlet diffuser and across the coil. An air handling unit is in flow communication with the fresh air inlet to provide the fresh airflow thereto.

A method of conditioning air in a room includes measuring a temperature of the room and determining that the measured temperature is outside of an acceptable temperature range. A flow of fresh air is urged into an air terminal located at the room, and the fresh airflow is urged into the room via an outlet diffuser, thereby inducing a return airflow into the air terminal via an inlet diffuser.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
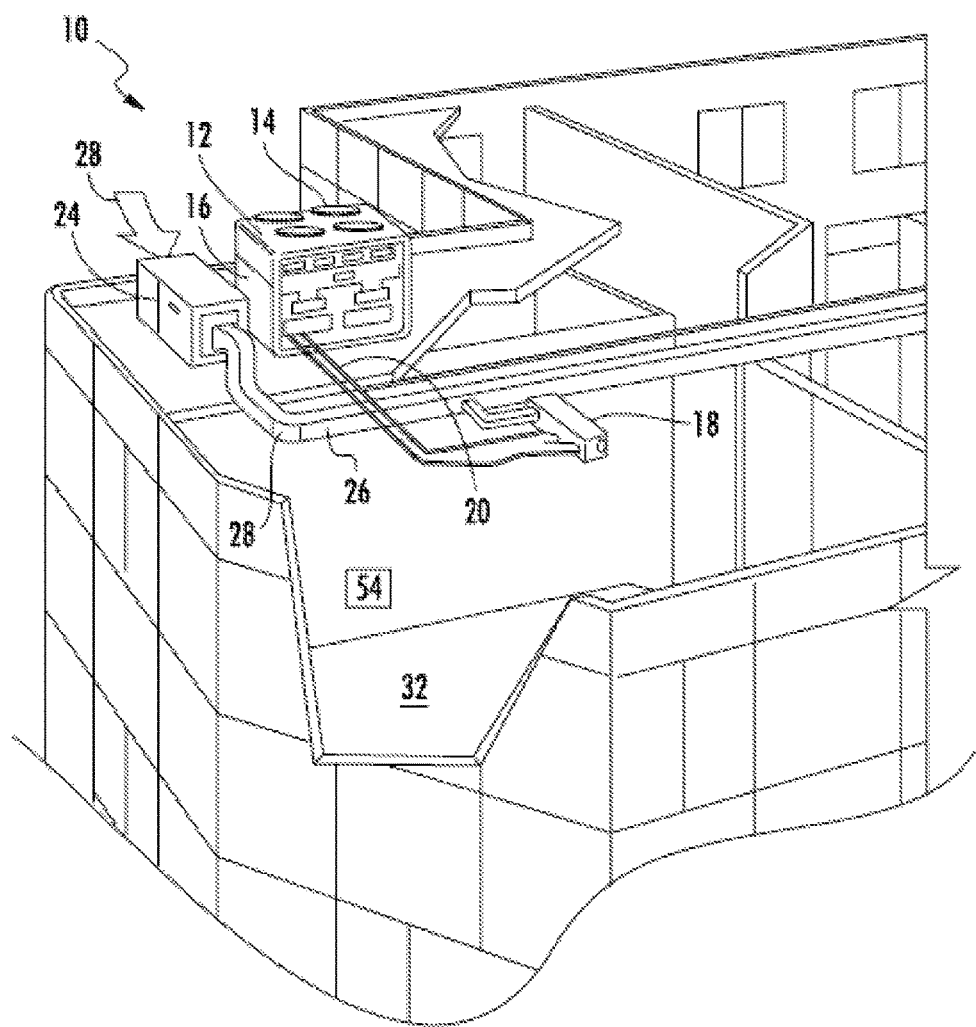
FIG. 1 is a schematic view of an embodiment of an air conditioning system.

Shown in FIG. 1 is an embodiment of a hybrid air terminal air conditioning system 10. The air conditioning system 10 may be utilized for increasing and/or decreasing a temperature of an interior space, for example, a room 32, and includes one or more apparatus for the production of cold and hot water. For example, the system may utilize heat pumps 12 which can produce hot and cold water, and/or the system may include one or more chillers 14 for production of cold water and one or more hot water production apparatus, such as a boiler 16. This combination allows for cold and/or hot water production for usage by the system depending on requirements for cooling or heating. A hybrid air terminal 18 is connected to the heat pumps 12, chillers 14, boiler 16, or the like via at least one water conduit 20. Further, in some embodiments, the system includes an air handling unit 24 connected to the hybrid air terminal 18 via a fresh air duct 26 to supply a fresh airflow 28 to the air terminal 18.

Figure 2:
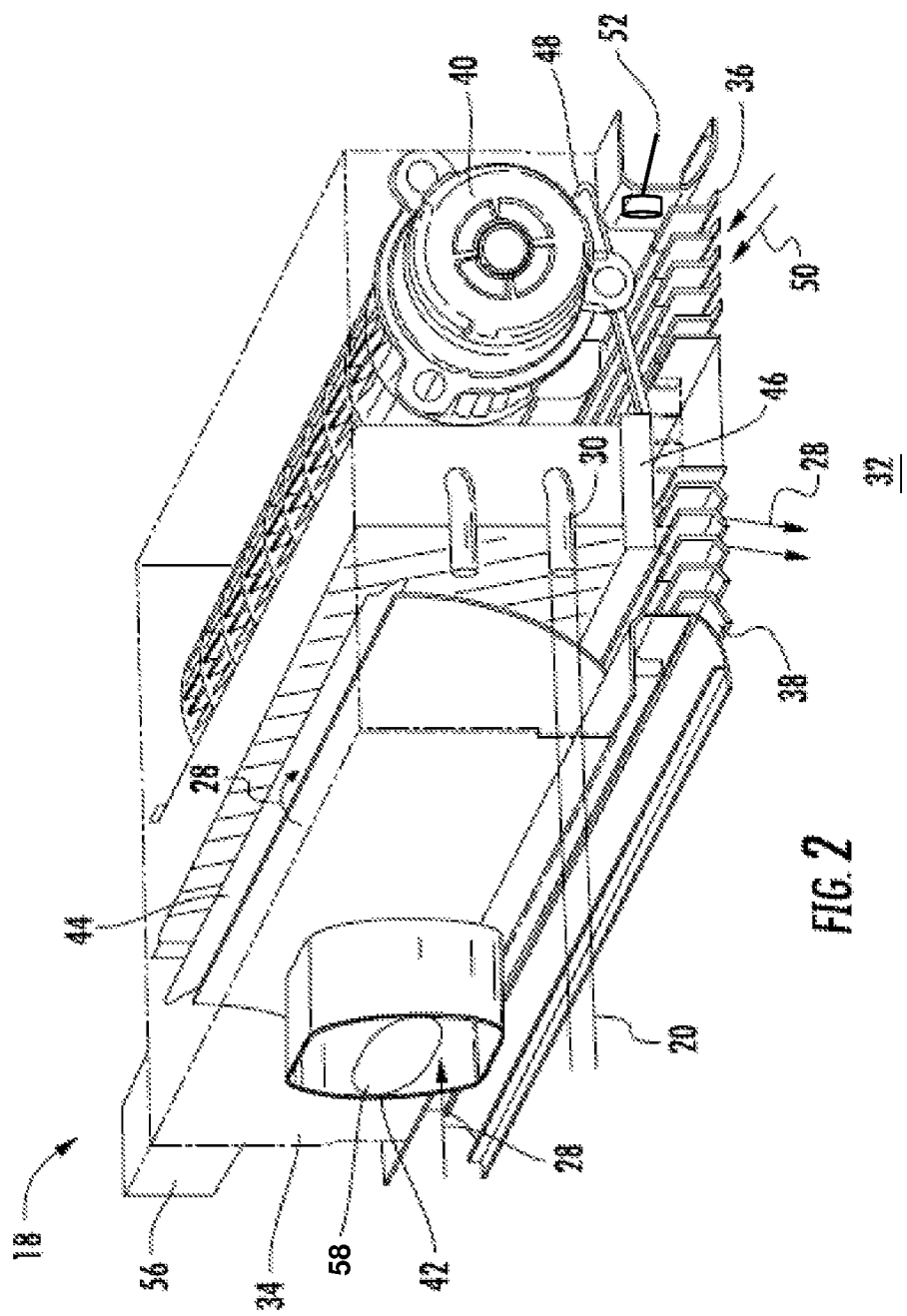
FIG. 2 is a schematic view of an embodiment of an air terminal for an air conditioning system.

Referring to FIG. 2, a coil 30 is located in the air terminal 18 and connected to the water conduit 20 to allow for circulation of the water from the conduit 20 through the coil 30. It is to be appreciated that while in some embodiments the fluid flow through the coil 30 is water, in other embodiments, other heat transfer mediums, such as water with additives or refrigerant, may be utilized. The coil 30 is located in a housing 34 of the air terminal 18, which also contains an inlet diffuser 36, an outlet diffuser 38, and a fan 40. A fresh air spigot 42 extends into the housing to allow fresh airflow 28 from the fresh air duct 26 into the air terminal 18, and the fresh airflow 28 across the coil 30 is metered by a nozzle 44 in the housing 34. Further, some embodiments of the air terminal 18 include additional features, such as a condensate drip pan 46 to capture any condensate from the coil 30. The presence of the drip pan 46 further allows a temperature of the heat transfer medium in the coil 30 to be reduced, such as in extremely warm weather, to meet the load necessary to cool the room 32, without the risk of condensation affecting the room 32 occupants. Additionally, a filter 48 may be located upstream of the fan 40 to filter a return airflow 50 into the air terminal 18 via the inlet diffuser 36. Further, the filter 48 protects the fan 40 and the coil 30 from damage. The system 10 may further include a $CO_2$ sensor 52 located, as shown in FIG. 2, at the inlet diffuser 36 to monitor CO2 levels of the room 32. Locating the $CO_2$ sensor 52 in the air terminal 18 simplifies installation of the air terminal 18 by reducing the number of parts to be later connected to the air terminal 18. It is to be appreciated, however, that in other embodiments the $CO_2$ sensor 52 may be provided in another location and operably connected to the air terminal 18. Further, as shown in FIG. 1, a temperature sensor 54 is located in the room 32 to monitor temperature therein. It is to be appreciated that in other embodiments, the temperature sensor 54 may be positioned in another location, for example, at the inlet diffuser 36. The temperature sensor 54 and the $CO_2$ sensor 52 are linked to a controller 56 of the air terminal 18, which is connected to the various components of the air terminal 18 to drive operational modes thereof.

Figure 3:
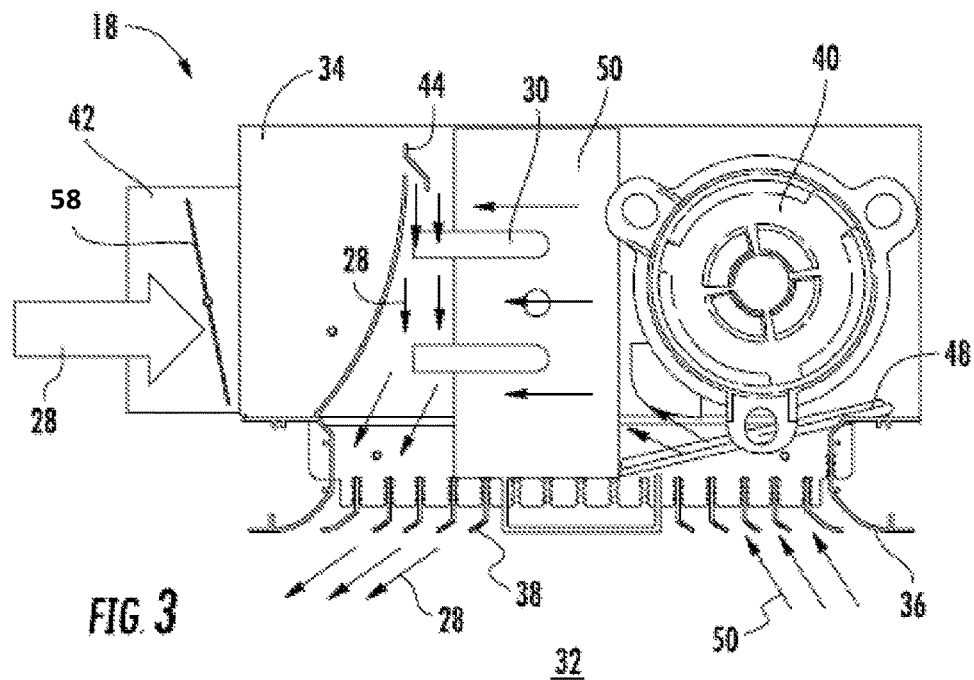
FIG. 3 is a cross-sectional view of an embodiment of an air terminal for an air conditioning system.

Referring now to FIG. 3, modes of operation of the system 10 including the hybrid air terminal 18 will now be described. In a first operating situation where the $CO_2$ sensor 52 indicates that CO2 levels in the room 32 are within an selected acceptable $CO_2$ range, and the temperature sensor 54 indicates that a temperature in the room 32 is within a selected acceptable temperature range, a minimal fresh airflow 28 is provided through the fresh air spigot 42, through the nozzle 44, across the coil 30 and through the outlet diffuser 38 into the room 32. The provision of minimal fresh air flow 28 is to maintain the present level of $CO_2$ within the acceptable $CO_2$ range, and such flow is metered by adjustment of a proportional air damper 58 located in the air terminal 18, for example at the fresh air spigot 42. In some embodiments, the air damper 58 is utilized when flow from the air handling unit 24 is substantially constant. The air damper 58 is also utilized to meter the fresh airflow 28 to avoid stratification issues in the room 32. During this operational mode, flow of heat transfer medium through the coil 30 is stopped by, for example, closing a coil valve (not shown), since the temperature is within the acceptable temperature range. Further, the fan 40 is off. In this mode, the fresh airflow 28 into the room 32 via the outlet diffuser 38 drives circulation of return airflow 50 into the air terminal 18 via the inlet diffuser 36. The return airflow 50 flows across the filter 48 and the coil 30 and flows back into the room 32 with the fresh airflow 28 through the outlet diffuser 38.

In a second operating condition, the $CO_2$ level in the room 32 is within the acceptable $CO_2$ range, but the temperature sensed by the temperature sensor 54 is outside of the acceptable temperature range, either too high or too low. In this mode, the fan 40 remains off and the flow of heat transfer medium through the coil 30 remains stopped. To correct the temperature in the room 32, the fresh airflow 28 is increased, by opening the air damper 58. If increasing the fresh air flow 28 alone is unsuccessful in returning the temperature to within the acceptable temperature range, a third operating condition is initiated. In this operating condition, the coil valve is opened to start flow of heat transfer medium, either heated or chilled depending on if the need is for increase or decrease in temperature of the room 32, through the coil 30. The fresh airflow 28 and the recirculating return airflow 50 flow across the coil 30 and exchange thermal energy therewith before flowing into the room 32 via the outlet diffuser 38 to bring the temperature in the room 32 into the acceptable temperature range.

Figure 4:
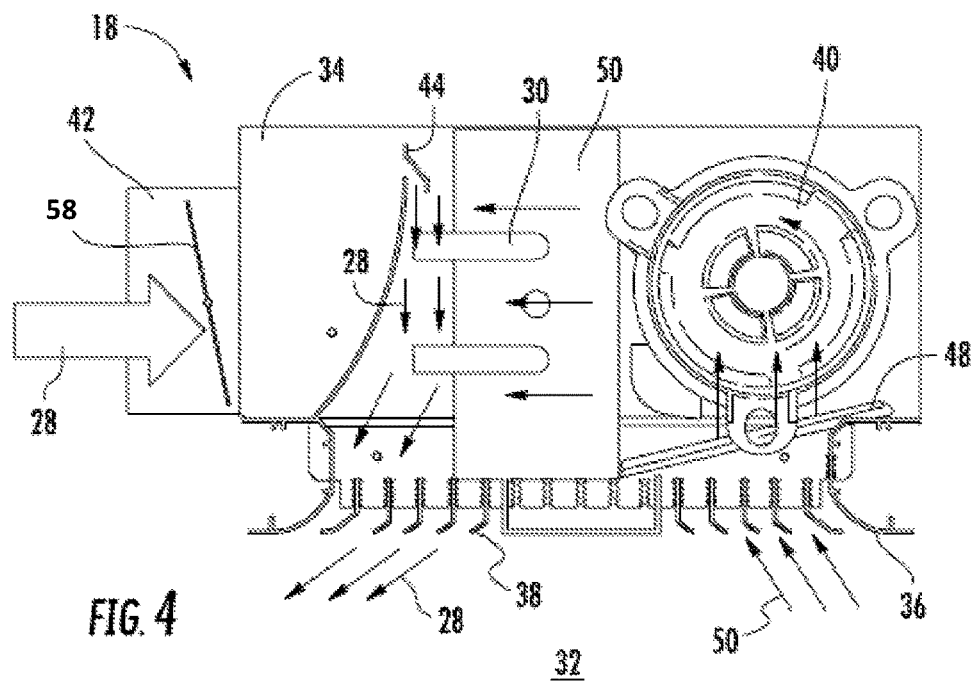
FIG. 4 is another cross-sectional view of an embodiment of an air terminal for an air conditioning system.

Referring now to FIG. 4, if activating flow through the coil 30 is unsuccessful in returning the temperature to within the acceptable temperature range, the air terminal 18 enters a fourth operational mode, one in which the fan 40 is turned on. Operation of the fan 40 increases return airflow 50 and flow across the coil 30, thus increasing capacity of the air terminal 18 to return the temperature to within the acceptable temperature range.

Combining the fan 40 with the air terminal 18 allows for other unique operational uses of the air terminal 18. For example, when the outdoor temperature goes against the load required by the room, such as a very hot summer night when the room requires cooling, the fan 40 may be operated with heat transfer medium flowing through the coil 30 to quickly cool the room 32 before occupants arrive in the morning. When the temperature in the room 32 reaches the acceptable temperature range, the fan 40 is turned off and the air terminal 18 operates in a free cooling mode via induction. Further, when the room 32 or building is unoccupied (such as in an office building at night), the air handling unit 24 driving the fresh airflow 28 into the system 10 may be turned off and heating or cooling of the room 32 is accomplished without the introduction of additional fresh airflow 28. When the building is reoccupied, such as in the morning, the air handling unit 24 may be restarted to start the fresh airflow 28 ensuring the $CO_2$ level remains within the acceptable $CO_2$ level range.

The disclosed hybrid air terminal 18 enables avoidance of many climatic beam operational drawbacks while using much of the typical climatic beam structure and including an additional fan. The operational modes of the air terminal 18 satisfy hygienic ($CO_2$) and comfort (temperature) requirements by providing at each stage the minimum required energy at the ventilation airside by minimizing added fresh airflow 28 and only operating fan 40 when necessary, and at the thermodynamic side by only flowing the heat transfer medium through the coil 30 when needed. This allows for reduction in the overall size of the air handling unit 24 and boosts also the climatic beam capacity by increasing the induction effect.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An air terminal for a heating or air conditioning system comprising:
   a housing:
   a fresh air inlet in the housing to supply a fresh airflow to the air terminal;
   an outlet diffuser disposed at the housing to allow airflow from the air terminal into a conditioned space;
   an inlet diffuser disposed at the housing to allow return airflow from the conditioned space into the air terminal;
   a coil disposed in the housing through which a heat transfer medium is flowable to condition the fresh airflow and/or the return airflow upstream of the fresh airflow and/or the return airflow flowing through the outlet diffuser into the conditioned space;
   a fan disposed in the housing to urge return airflow through the inlet diffuser and across the coil, the fan and the inlet diffuser each disposed at a first side of the coil and the outlet diffuser and the fresh air inlet each disposed at a second side of the coil opposite the first side; and,
   further comprising a nozzle to direct the fresh airflow across the coil.

2. The air terminal of claim 1, further comprising a $CO_2$ sensor operably connected to the air terminal to measure a $CO_2$ level in the conditioned space.

3. The air terminal of claim 1, further comprising an air damper disposed at the fresh air inlet to regulate the fresh airflow into the terminal.

4. The air terminal of claim 1, further comprising a filter disposed upstream of the fan to filter the return airflow.

5. The air terminal of claim 1, further comprising a drip pan disposed at the coil to capture condensation from the coil.

* * * * *